March 21, 1939.   E. L. MILLARD   2,151,222
HEAT CONTROL MECHANISM
Filed Feb. 27, 1937   2 Sheets-Sheet 1

Inventor
Everett L. Millard
By Barnett a Truman
Attorneys

March 21, 1939. E. L. MILLARD 2,151,222
HEAT CONTROL MECHANISM
Filed Feb. 27, 1937 2 Sheets-Sheet 2
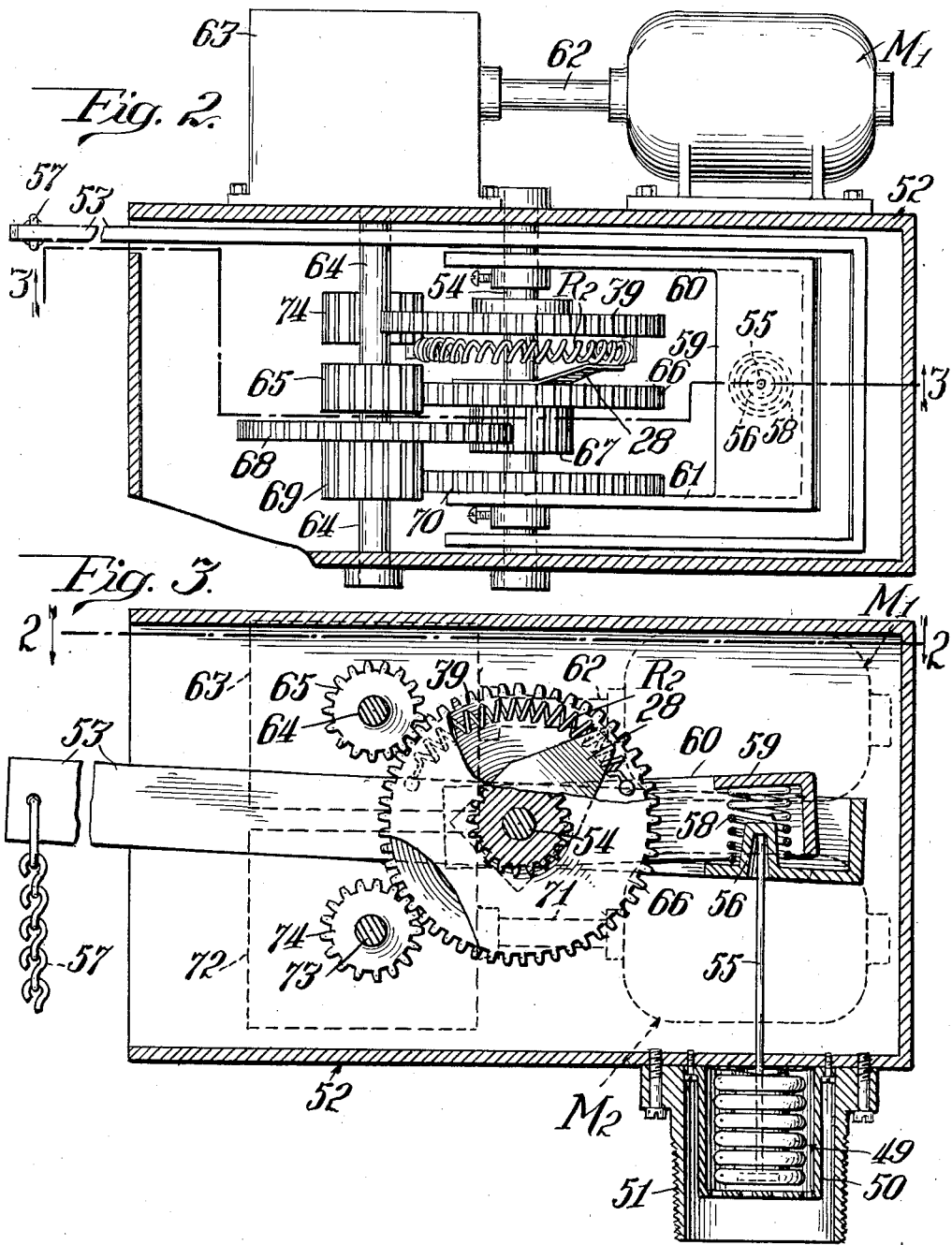
Inventor
Everett L. Millard
By Barnett & Truman
Attorneys.

Patented Mar. 21, 1939

2,151,222

UNITED STATES PATENT OFFICE 2,151,222

HEAT CONTROL MECHANISM

Everett L. Millard, Highland Park, Ill.

Application February 27, 1937, Serial No. 128,211

13 Claims. (Cl. 236—74)

This invention relates to a new and improved heat control mechanism, more particularly a thermostatically controlled and electrically actuated system for automatically governing the flow of heat to an enclosure whereby heat losses are replaced and the enclosure is maintained at a predetermined desired temperature.

A proportioning control system has already been proposed involving the use of control and balancing resistances or rheostats, the control resistance being automatically adjusted or unbalanced by a controlling thermostat responsive to temperature changes within the enclosure so as to cause, through suitable electrical actuating mechanism a proportionate adjustment of the flow of heat to the enclosure, the balancing resistance being automatically adjusted as the heat controller is moved to reestablish the balance of resistances and stop further movement of the heat proportioning mechanism. For reasons that will be hereinafter set forth, such a system is ineffective to accurately maintain a desired temperature when changes in outside temperature so vary the normal heat losses from the enclosure that the normal supply of heat required to maintain the desired temperature within the enclosure is materially altered. The present invention involves the addition to a proportioning system such as just described of a second thermostat, also responsive to temperature changes within the enclosure, and functioning at the limits of a small predetermined temperature range bracketing the desired temperature to additionally unbalance or reset the resistances of the proportioning system so that the newly required normal flow of heat to the enclosure will be maintained by the proportioning system.

The principal object of this invention is to provide an improved heat control system of the type briefly described hereinabove and disclosed more in detail in the specifications which follow.

Another object is to provide an improved heat control system comprising two separate controlling thermostats both responsive to temperature changes within an enclosure, one of the thermostats controlling a proportioning heat control mechanism, and the other thermostat operating at the limits of a small predetermined temperature range to reset the proportioning system in accordance with outside temperature changes, or changes in the normal rate of heat loss from the enclosure.

Another object is to provide a heat control system in which the supply of heat to a heating medium is controlled by temperature changes in the heating medium, and an additional thermostatic control of the type hereinabove referred to is utilized to adjust the effect of the first mentioned thermostatic control and vary the normal temperature of the heating medium.

Other objects and advantages of this invention will be more apparent from the following detailed description of certain approved apparatus combinations adapted to function according to the principles of this invention.

In the accompanying drawings:

Fig. 2 is a horizontal section on the line 2—2 of Fig. 3 showing the application of this invention to a mechanism for governing the normal temperature of a heating medium, such as the water in a hot-water heating system.

Fig. 3 is a vertical section taken substantially on the line 3—3 of Fig. 2.

Figure 1:
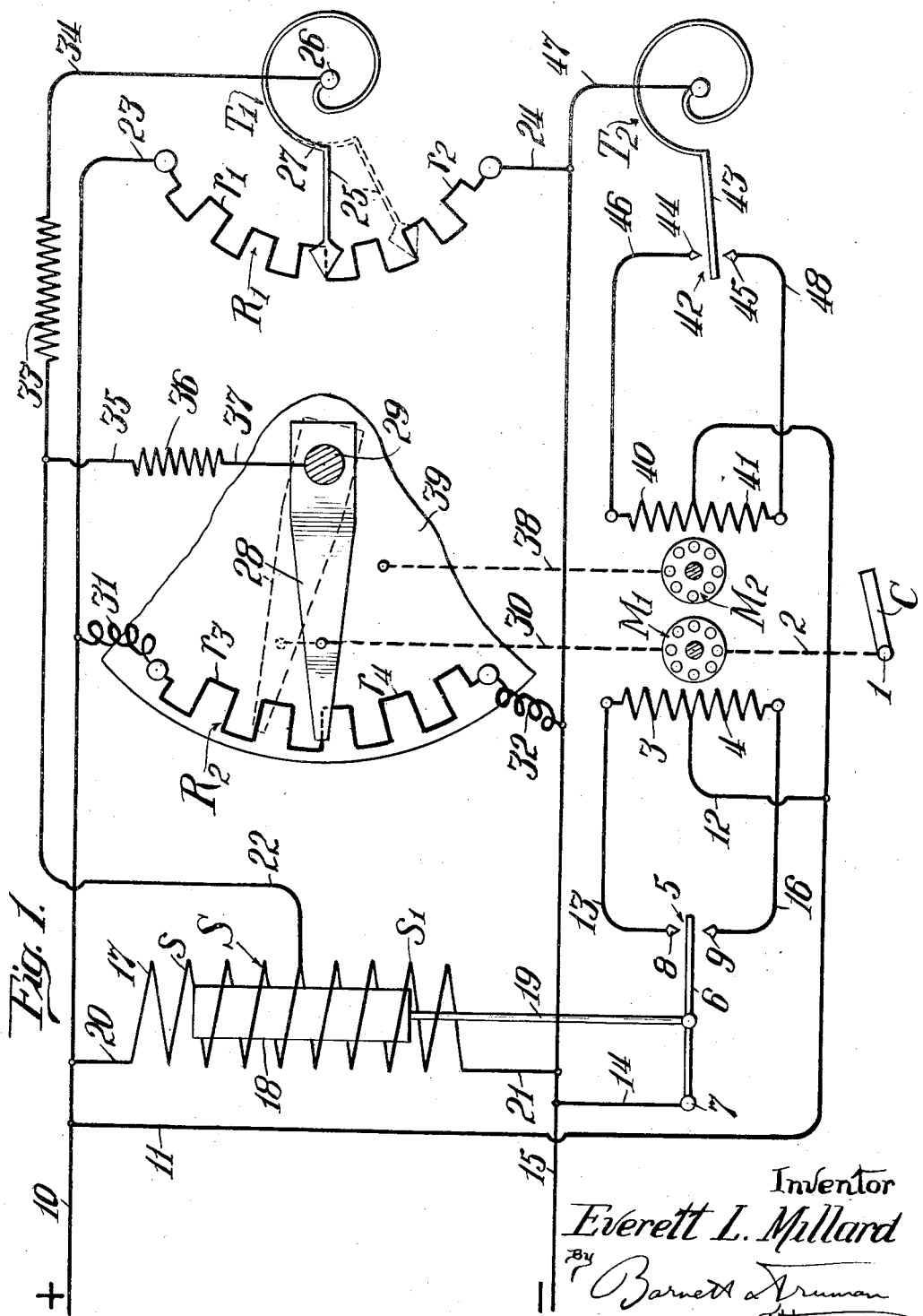
Fig. 1 is a diagrammatic view and wiring diagram illustrating the operating principles of the invention.

Referring first to Fig. 1, at C is indicated a crank-arm or lever or other equivalent rotatable or movable device adapted to adjust the position of a valve, draft-arm or damper or other equivalent device whereby the rate of flow or temperature of a heating medium delivered to the enclosure is controlled. This member C may be considered as pivoted at 1 and moved in one direction or the other by the small reversible motor $M_1$ through the reduction gearing indicated diagrammatically by the broken line at 2. The motor $M_1$ is provided with two alternative fields 3 and 4. When field 3 is energized the motor will be rotated in one direction and when field 4 is energized the motor will be rotated in the other direction. When neither field is energized the motor will be at rest. It may here be stated that instead of the reversible motor $M_1$ (or the similar reversible motor $M_2$ hereinafter described) a pair of oppositely rotating motors each provided with its own field, and adapted to alternately adjust the member C in one direction or the other could be substituted, and the term "reversible motor" as used in this description and in the claims which follow is intended to cover any such equivalent construction.

The reversing-switch indicated generally at 5 comprises a movable contact arm 6 pivoted at 7 and adapted when moved in one direction or the other from the neutral position shown in the drawings to engage one or the other of the fixed contacts 8 or 9. When movable contact 6 is lifted into engagement with fixed contact 8 the motor-field 3 will be energized through the following circuit: From positive main 10 through wires 11 and 12, field 3, wire 13, fixed contact 8, movable contact 6, and wire 14 to the negative main 15. This will cause motor $M_1$ to rotate in one direction (for example clockwise) and through gearing 2 adjust member C in one direction. If movable contact 6 is lowered into engagement with contact 9 a circuit energizing the other field 4 will be completed as follows: From positive main 10 through wires 11 and 12, field 4, wire 16, switch contacts 9 and 6, and wire 14 to the negative main. The energization of field 4 will cause motor $M_1$ to rotate in the opposite direction (for example counterclockwise) thus moving controller C in the opposite direction to that previously noted.

The solenoid-motor indicated at S comprises the solenoid coil 17 surrounding the core 18 which is connected through stem 19 with the movable switch contact 6. The coil 17 is connected at one end through wire 20 with positive main 10 and at the other end through wire 21 with the negative main 5. A circuit wire 22 connects with the mid-point of coil 17 so as to divide the solenoid coil into two similar halves $s$ and $s_1$. When the same current flows through both halves $s$ and $s_1$ of the solenoid, the core 18 will be held in the mid-position indicated in the drawings thus holding movable switch contact 6 in its neutral position between fixed contacts 8 and 9. At such times the motor $M_1$ will be at rest.

A control resistance or rheostat coil $R_1$ is connected at one end through wire 23 with the positive main 10 and at the other end through wire 24 with the negative main 15. The movable contact arm 25 of this rheostat is adapted to engage resistance $R_1$ at some selected position intermediate its ends so as to divide the resistance $R_1$ into two effective resistances $r_1$ and $r_2$. The position of contact arm 25 is selectively adjusted by means of a controlling thermostat $T_1$ positioned at some selected control point within the enclosure and responsive to temperature changes at this location. As here shown this thermostat is of the metallic coil type, the thermostatic coil being anchored at one end 26 and carrying the movable contact 25 at its free end 27.

The balancing resistance or rheostat $R_2$ comprises, in addition to the resistance member, a movable contact arm 28 pivoted at one end 29 and engaging the resistance at its other end so as to divide this resistance $R_2$ into two effective resistance portions $r_3$ and $r_4$. The movable contact arm 28 is connected through suitable reduction gearing indicated diagrammatically by the broken line at 30 with motor $M_1$ so that arm 28 will be adjusted longitudinally of the resistance $R_2$ as the controlling member C is moved and in proportion to such movement.

Balancing resistance $R_2$ is connected at one end through wire 31 with the positive main 10 and at the other end through wire 32 with the negative main 15. The connected ends of the two solenoid coil portions $s$ and $s_1$ are connected through wire 22, protective resistance 33, and wire 34 with the anchored end 26 of thermostat $T_1$ and thence to movable contact arm 25. A branch circuit extends from wire 22 through wire 35, protective resistance 36, and wire 37 to one end of movable contact 28 of the resistance $R_2$.

The proportioning system as thus far described is already known in the art. It will be noted that one circuit extends from positive main 10 through one half portion $s$ of the solenoid coil and thence through resistance portion $r_2$ of the control resistance and $r_4$ of the balancing resistance arranged in parallel to the negative main 15. Another circuit extends from positive main 10 through the resistance portions $r_1$ and $r_3$ arranged in parallel, to and through the other solenoid portion $s_1$ and thence through negative main 15. Assuming that at the desired temperature to be maintained within the enclosure (for example 70°) the movable contacts 25 and 28 will be positioned at the mid-points of resistances $R_1$ and $R_2$ respectively, it will be noted that the resistances in circuit with the two halves of the solenoid coil will be equal so that the same current will flow throughout this coil and core 18 will be held in its mid-position as shown in the drawings, with reversing switch 5 in its neutral position and the motor $M_1$ at rest. Assuming now that the temperature at the location of thermostat $T_1$ falls (for example to 67°), the movable arm 25 will be shifted to a new position, for example that shown in dotted lines. This will increase the value of the resistance $r_1$ and decrease the resistance $r_2$. At the same time the resistances $r_3$ and $r_4$ will remain unchanged or equal. This will decrease the total resistance in circuit with portion $s$ of the solenoid coil, and will at the same time increase the resistance in circuit with the other portion $s_1$ of this coil. As a result a heavier current will flow through the portion $s$ of the coil than flows through the portion $s_1$ and core 18 will be lifted to bring movable contact 6 of the reversing switch 5 into engagement with fixed contact 8. This will cause motor $M_1$ to move the control arm C in such direction as to increase the flow of heat to the enclosure, the increase in heat supply being proportional to the change in temperature within the enclosure as registered by the magnitude of the movement of contact arm 25 in response to the movement of thermostat $T_1$. As motor $M_1$ rotates to move arm C the desired distance, it will through gearing connection 30 shift the position of contact arm 28 so as to decrease the resistance $r_3$ of balancing resistance $R_2$ and increase the value of resistance $r_4$. At the time the necessary movement of motor $M_1$ has been accomplished, contact arm 28 will have reached such a position that the effective total of resistances $r_1$ and $r_3$ will be equal to the effective total of resistances $r_2$ and $r_4$ whereupon the system will again be balanced and the same currents will flow through solenoid coils $s$ and $s_1$. This will return all parts to their neutral position and motor $M_1$ will again be at rest. The increased supply of heat to the enclosure as determined by the new position of controller C will eventually increase the temperature at thermostat $T_1$ whereupon contact arm 25 will be moved back toward its original position thus again unbalancing the system and in an obvious manner causing motor $M_1$ to rotate in a reverse direction and move the controller C so as to cut down the flow of heat.

A proportioning system of the type thus far described will be theoretically effective providing the normal heat losses from the enclosure are substantially constant. For example, assuming that, as before, an inside temperature of 70° is to be maintained, and also assuming that the outside temperature remains constant at, for example 40°, it may also be assumed that the normal heat losses from the enclosure will also be substantially constant. Under such conditions it may be assumed that a normal supply of $n$ heat units to the enclosure will offset the normal heat losses and maintain the desired inside temperature. If for some temporary cause, for example the opening of doors or windows, the temperature at the control point is lowered, the proportioning system as hereinabove described will adjust the controller C so as to provide for an increased flow of heat to the enclosure, for example $n'$ heat units. This increased flow of heat will tend to reestablish the desired temperature at the control point whereupon the controlling system will be adjusted back to its original position thus reestablishing the normal flow of $n$ heat units to the enclosure. However, let it now be assumed that for some reason such as the lowering of the outside prevailing temperature to 0°, the normal heat losses from the enclosure have been increased so that a normal increased supply of $n'$ heat units is required to maintain the desired inside temperature of 70°. This increased flow of heat to the enclosure will, as before, upon reestablishing the desired temperature within the enclosure, restore the system to its original balance which in turn will cut down the heat supply to the original $n$ heat units which is no longer sufficient to maintain the desired temperature. As a result an intermediate rate of heat supply (for example $n''$ heat units) will be established and the inside temperature maintained will be for example 68°, or something less than the desired temperature. In order to maintain the desired temperature at 70° under these new conditions which require a normal heat supply of $n'$ heat units it is necessary to reset or rebalance the proportioning system by some means which will effect a readjustment of the controlling resistances.

Furthermore, if the resistances $R_1$ and $R_2$ are delicately poised or adjusted so as to operate in a narrower temperature differential at the control point, there is a tendency for the balancing resistance to swing or hunt over a rather wide range. On the other hand, if a coarser differential is allowed so that a considerable temperature change at the control point is necessary to effect the operation of the system, the temperature at this control point will be permitted to droop to an undesirable extent when an increase in the heat production is required.

In order to overcome these defects and permit a practically operative proportioning system of the coarser differential type to be used, the improvements of the present invention have been added to the combination already described. The balancing resistance $R_2$ is movably mounted, preferably pivoted at the same point 29 as the movable contact arm 28, so that this resistance can be adjusted with respect to the position of the contact arm in addition to the adjustment of arm 28 by motor $M_1$ as already described. A second reversible motor $M_2$ (which may be similar in all respects to the previously described motor $M_1$) is connected through suitable reduction gearing 38 with the wheel or sector 39 upon which resistance $R_2$ is mounted so as to very slowly adjust the position of this resistance in response to the rotation of motor $M_2$. Alternatively, in place of the reduction gearing, suitable means for imparting an interrupted or step by step movement at a greater speed could be used. Motor $M_2$ is provided with the alternative fields 40 or 41 by which rotation in one direction or the other is provided. The reversing switch indicated generally at 42 comprises a movable contact arm 43 positioned between the fixed contacts 44 and 45 and adapted to alternatively contact therewith at the limits of a predetermined small temperature range, for example 2°. Contact arm 43 is carried at the movable end of a second thermostat $T_2$ positioned adjacent thermostat $T_1$ and responsive to temperature changes within the enclosure. Let it be assumed, for example, that at the desired temperature of 70° the movable contact 43 will be positioned midway between fixed contacts 44 and 45 but out of engagement with both of these contacts. At 71° movable contact 43 will engage the fixed contact 44, and at 69° it will engage the fixed contact 45. Assuming that the temperature at the control point has risen to 71°, the following circuit energizing field 40 will be established: from positive main 10 through wire 11, field 40, wire 46, fixed contact 44, movable contact 43, thermostat $T_2$, and wire 47 to the negative main 15. On the other hand, assuming that the temperature has fallen to 69°, the following circuit energizing field 41 will be established: from positive main 10 through wire 11, field 41, wire 48, fixed contact 45, movable contact 43, thermostat $T_2$, and wire 47 to negative main 15. As a result the motor $M_2$ will be rotated in one direction or the other so as to adjust resistance $R_2$ in one direction or the other as the temperature at the control point rises above or falls below the predetermined small range for which thermostat $T_2$ is set.

In operation, provided the temperature variation at the control point where thermostats $T_1$ and $T_2$ are positioned is beyond one limit or the other of the small operating range of movable contact 43 between the fixed contacts 44 and 45 of reversing switch 42, the movable resistance $R_2$ will be adjusted so as to further unbalance the proportioning system and provide for an increased adjustment of control member C, and by the time the system is eventually rebalanced with thermostat $T_1$ at its original position corresponding to an inside temperature of 70°, the resistances of the proportioning system will be so reset that the normal continuous flow of heat units to the enclosure will be at the new rate of $n'$ heat units necessary to offset the greater heat losses corresponding to the lowered outside temperature.

It will be understood that in case the outside temperature change is in the opposite direction so that the normal heat losses are lowered, the system will be reset in the opposite direction so as to provide for a normal decreased flow of heat units.

While the system has been described by way of example as adjusting the balancing resistance $R_2$ to reset the apparatus, it will be understood that similar results could be obtained by properly readjusting the position of resistance $R_1$, or of the contact arm 25 with relation to thermostat $T_1$, or movable arm 28 with relation to the operating connections 30. It is only essential that a readjustment of the balancing resistances be established so that the setting of control member C will be changed with relation to the normal 70° position of controlling thermostat $T_1$.

It will be understood that the temperatures mentioned hereinabove are merely illustrative and that the mechanism could be adjusted for maintaining any desired inside temperature. Also the range of temperatures determined by reversing switch 42 could be increased or decreased as found desirable.

In Figs. 2 and 3 is partially illustrated an apparatus wherein the principles of this invention are utilized for properly controlling the temperature of a heating medium (for example the water in a hot-water heating system) instead of its rate of flow. At 49 is indicated a thermostatic device of the expansible bellows type, which is filled with an expansible or contractible heat-responsive fluid. The thermostatic bellows is housed within a perforated protective casing 50 which is housed within a thimble 51 adapted to be fitted into the receptacle containing the heating medium, for example the hot water in a hot-water heating system. The thermostat 49 will thus respond to changes in the temperature of this heating medium. A casing 52 is mounted on thimble 51, and housed within this casing is a control lever 53 intermediately pivoted on horizontal shaft 54. The rod or stem 55 secured at its lower end to the movable end of thermostatic bellows 49, engages at its upper end in a socket 56 formed in one arm of lever 53. The other end of this lever is connected by suitable means (here shown as a chain 57) with a valve or damper or equivalent means by which the supply of heat to the heating medium is regulated. Suitable adjustable weights or springs applied to the control arm 53 (but not here shown) permit adjustment of the otherwise constant temperature that will be maintained in the heating medium by this apparatus.

A compression spring 58 (which may be centered about the socket member 56) is interposed between the first mentioned arm of control lever 53 and an anchoring member 59 here shown as provided with side arms 60 and 61 which are secured to the shaft 54. Spring 58 tends to resist the movement of control lever 53 in response to the upward pressure of stem 55, and the force of this spring will be constant as long as anchoring device 59 remains in any one selected position. Motor M₁ is connected through motor shaft 62, reduction gearing 63, shaft 64, and gear 65 keyed on shaft 64, with a gear 66 freely rotatable on central shaft 54 and carrying the movable contact 28 of the balancing resistance R₂. Shaft 64 is also adapted to adjust the position of anchoring device 59 through the chain of reduction gearing comprising gear 67 secured to gear 66 and freely rotatable on shaft 54, gears 68 and 69 secured together and freely rotatable on shaft 64, and gear 70 keyed on central shaft 54 so as to move the anchoring device. The other motor M₂ operates through motor shaft 71, reduction gearing 72, shaft 73, gear 74 keyed on shaft 73, and gear 39 freely rotatable on central shaft 54 to adjust the position of the resistance R₂ which is mounted on gear 39. The adjustable anchoring member 59 corresponds to the control member C of Fig. 1. The thermostats T₁ and T₂, solenoid S, and reversing switches 5 and 42 are not illustrated in Figs. 2 and 3. It will be understood that these devices can be located at another position and connected by suitable wiring with the apparatus disclosed in Figs. 2 and 3 as illustrated for example in Fig. 1. The electrical apparatus will function in the manner hereinabove disclosed in detail to adjust the position of anchoring member 59 and thus vary the temperature at which the hot-water or other heating medium is maintained so as to properly regulate the supply of heat units to the enclosure heated by this heating medium.

I claim:

1. An apparatus for maintaining a desired temperature within an enclosure comprising a control member for adjusting the continuous supply of heat to the enclosure, a pair of thermostats each responsive to the same temperature changes within the enclosure, electrically actuated means controlled by one of the thermostats for proportionately adjusting the control member in accordance with the movements of said thermostat, and electrically actuated means controlled by the second thermostat at the limits of a predetermined small temperature range bracketing the desired temperature for resetting the proportional adjusting means to provide a changed normal supply of heat at the desired temperature.

2. An apparatus for maintaining a desired temperature within an enclosure comprising a control member for adjusting the continuous supply of heat to the enclosure, a pair of thermostats each responsive to the same temperature changes within the enclosure, electrically actuated means comprising a variable resistance that is adjusted by one of the thermostats for proportionally adjusting the control member in accordance with variations in the resistance, and electrically actuated means controlled by the second thermostat at the limits of a predetermined small temperature range bracketing the desired temperature for resetting the proportional adjusting means to provide a changed normal supply of heat at the desired temperature.

3. An apparatus for maintaining a desired temperature within an enclosure comprising a main control member for adjusting the continuous flow of heat to the enclosure and an electrically actuated system for adjusting the member comprising a control resistance, a balancing resistance, a thermostat responsive to temperature changes within the enclosure for proportionately unbalancing the control resistance as the temperature changes within the enclosure, means actuated as the control member is adjusted for adjusting the balancing resistance to restore the balance in the system to stop the movement of the control member, a second thermostat also responsive to the same temperature changes within the enclosure, and electrically actuated means controlled by said second thermostat at the upper or lower limits of a small predetermined temperature range bracketing the desired temperature to additionally unbalance the resistance system whereby the system will be reset for a changed heat flow at the desired temperature within the enclosure.

4. An apparatus for maintaining a desired temperature within an enclosure comprising a main control member for adjusting the continuous flow of heat to the enclosure, and an electrically actuated system for adjusting the member comprising a control resistance, a balancing resistance, a thermostat responsive to temperature changes within the enclosure for proportionately unbalancing the control resistance as the temperature changes within the enclosure, means actuated as the control member is adjusted for adjusting the balancing resistance to restore the balance in the system to stop the movement of the control member, a second thermostat also responsive to the same temperature changes within the enclosure, and electrically actuated means controlled by said second thermostat at the upper or lower limits of a small predetermined temperature range bracketing the desired temperature to additionally adjust the balancing resistance whereby the system will be reset for a changed heat flow at the desired temperature within the enclosure.

5. An apparatus for maintaining a desired temperature within an enclosure comprising a main control member for adjusting the continuous flow of heat to the enclosure, and an electrically actuated system for adjusting the member comprising a reversible motor, a control resistance, a balancing resistance, a thermostat responsive to temperature changes within the enclosure for proportionately unbalancing the control resistance as the temperature changes within the enclosure, means actuated by the reversible motor as the main control movable member is moved for adjusting the balancing resistance to restore the balance in the system to stop the movement of the control member, a second thermostat also responsive to the same temperature changes within the enclosure, and electrically actuated means controlled by said second thermostat at the upper or lower limits of a small predetermined temperature range bracketing the desired temperature to additionally unbalance the system whereby the system will be reset for a changed heat flow at the desired temperature within the enclosure, said last mentioned means including a second reversible motor, a reversing switch controlled by the second thermostat, and means actuated by the second motor to adjust one of the resistance members.

6. An apparatus for maintaining a desired temperature within an enclosure comprising a main control member for adjusting the continuous flow of heat to the enclosure, and an electrically actuated system for adjusting the member comprising a reversible motor, a control resistance, a balancing resistance, a thermostat responsive to temperature changes within the enclosure for proportionately unbalancing the control resistance as the temperature changes within the enclosure, means actuated as the main control movable member is moved for adjusting the balancing resistance to restore the balance in the system to stop the movement of the control member, a second thermostat also responsive to the same temperature changes within the enclosure, and electrically actuated means controlled by said second thermostat at the upper or lower limits of a small predetermined temperature range bracketing the desired temperature to additionally unbalance the system whereby the system will be reset for a changed heat flow at the desired temperature within the enclosure, said last mentioned means including a second reversible motor, a reversing switch controlled by the second thermostat, and means actuated by the second motor to adjust the balancing resistance.

7. An apparatus for maintaining a desired temperature within an enclosure comprising a movable member for adjusting the continuous flow of heat to the enclosure, a reversible motor for moving the member, a circuit including a reversing switch for selectively actuating the motor in either direction, a solenoid motor comprising a coil and a movable core for actuating the switch, a control resistance and a balancing resistance, each comprising a resistance coil and a relatively movable contact member which divides the coil into two selected portions, movement of the contact member increasing one portion and decreasing the other portion, electrical connections whereby one half of the solenoid coil is connected in circuit with one selected portion of each resistance and the other half of the solenoid is connected in circuit with the other portions of the resistances, a thermostat responsive to changes in temperature within the enclosure for moving the contact member of the control resistance to unbalance the currents in the two halves of the solenoid, and means actuated by the reversible motor for moving the contact of the balancing resistance to restore the balance of the currents in the solenoid, a second reversible motor, means actuated by this motor for moving one of the relatively movable parts of one of the resistance members to additionally unbalance the system, a circuit including a second reversing switch for selectively actuating the second motor in either direction, and a second thermostat also responsive to the same temperature changes within the enclosure for actuating the second reversing switch.

8. An apparatus for maintaining a desired temperature within an enclosure comprising a movable member for adjusting the continuous flow of heat to the enclosure, a reversible motor for moving the member, a circuit including a reversing switch for selectively actuating the motor in either direction, a solenoid motor comprising a coil and a movable core for actuating the switch, a control resistance and a balancing resistance, each comprising a resistance coil and a relatively movable contact member which divides the coil into two selected portions, movement of the contact member increasing one portion and decreasing the other portion, electrical connections whereby one half of the solenoid coil is connected in circuit with one selected portion of each resistance and the other half of the solenoid is connected in circuit with the other portions of the resistances, a thermostat responsive to changes in temperature within the enclosure for moving the contact member of the control resistance to unbalance the currents in the two halves of the solenoid, and means actuated by the reversible motor for moving the contact of the balancing resistance to restore the balance of the currents in the solenoid, a second reversible motor, means actuated by this motor for moving the resistance coil of the balancing resistance to additionally unbalance the circuits, a circuit including a second reversing switch for selectively actuating the second motor in either direction, and a second thermostat also responsive to the same temperature changes within the enclosure for actuating the second reversing switch.

9. An apparatus for maintaining a desired temperature within an enclosure comprising a movable member for adjusting the continuous flow of heat to the enclosure, a reversible motor for moving the member, a circuit including a reversing switch for selectively actuating the motor in either direction, a solenoid motor comprising a coil and a movable core for actuating the switch, a control resistance and a balancing resistance, each comprising a resistance coil and a relatively movable contact member which divides the coil into two selected portions, movement of the contact member increasing one portion and decreasing the other portion, electrical connections whereby one half of the solenoid coil is connected in circuit with one selected portion of each resistance and the other half of the solenoid is connected in circuit with the other portions of the resistances, a thermostat responsive to changes in temperature within the enclosure for moving the contact member of the control resistance to unbalance the currents in the two halves of the solenoid, and means actuated by the reversible motor for moving the contact of the balancing resistance to restore the balance of the currents in the solenoid, and means comprising a second thermostat also responsive to the same temperature changes within the enclosure and operative at the limits of a predetermined small temperature range bracketing the desired temperature to additionally unbalance the resistance system and reset the system to provide a changed normal supply of heat at the desired inside temperature.

10. An apparatus for maintaining a desired temperature within an enclosure comprising a thermostat responsive to temperature changes in the heating medium which supplies heat to the enclosure, connections actuated by this thermostat for regulating the supply of heat to the medium, and means for adjusting the connections to change the temperature at which the heating medium is maintained by said thermostat comprising a pair of thermostats each responsive to the same temperature changes within the enclosure, electrically actuated means controlled by one of the pair of thermostats for proportionately adjusting the connections in accordance with the movements of this thermostat, and electrically actuated means controlled by the other thermostat of the pair at the limits of a predetermined small temperature range bracketing the desired enclosure temperature for resetting the proportional adjusting means.

11. An apparatus for maintaining a desired temperature within an enclosure comprising a thermostat responsive to temperature changes in the heating medium which supplies heat to the enclosure, connections actuated by this thermostat for regulating the supply of heat to the medium, and means for adjusting the connections to change the temperature at which the heating medium is maintained by said thermostat comprising a pair of thermostats each responsive to the same temperature changes within the enclosure, electrically actuated means comprising a variable resistance that is adjusted by one of the thermostats of the pair for proportionately adjusting the connections in accordance with variations in the resistance, and electrically actuated means controlled by the second thermostat of the pair at the limits of a small predetermined temperature range bracketing the desired enclosure temperature for resetting the proportional adjusting means.

12. An apparatus for maintaining a desired temperature within an enclosure comprising a thermostat responsive to temperature changes in the heating medium which supplies heat to the enclosure, mechanical connections actuated by this thermostat for regulating the supply of heat to the medium, an adjustable anchoring means, a spring interposed between a portion of the connections and the anchoring means for resisting movement of the connections in one direction, and means for adjusting the anchoring means to change the spring resistance and thereby vary the temperature at which the heating medium is maintained by the thermostat, said last mentioned means comprising a pair of thermostats each responsive to temperature changes within the enclosure, electrically actuated means controlled by one thermostat of the pair for proportionately adjusting the anchoring means in accordance with the movements of said thermostat, and electrically actuated means controlled by the other thermostat of the pair at the limits of a predetermined small temperature range bracketing the desired enclosure temperature for resetting the proportional adjusting means.

13. An apparatus for maintaining a desired temperature within an enclosure comprising a thermostat responsive to temperature changes in the heating medium which supplies heat to the enclosure, mechanical connections actuated by this thermostat for regulating the supply of heat to the medium, an adjustable anchoring means, a spring interposed between a portion of the connections and the anchoring means for resisting movement of the connections in one direction, and means for adjusting the anchoring means to change the spring resistance and thereby vary the temperature at which the heating medium is maintained by the thermostat, said last mentioned means comprising a pair of thermostats each responsive to temperature changes within the enclosure, electrically actuated means comprising a variable resistance that is adjusted by one thermostat of the pair for proportionately adjusting the anchoring means in accordance with variations in the resistance, and electrically actuated means controlled by the second thermostat of the pair at the limits of a small predetermined temperature range bracketing the desired enclosure temperature for resetting the proportional adjusting means.

EVERETT L. MILLARD.